UNITED STATES PATENT OFFICE.

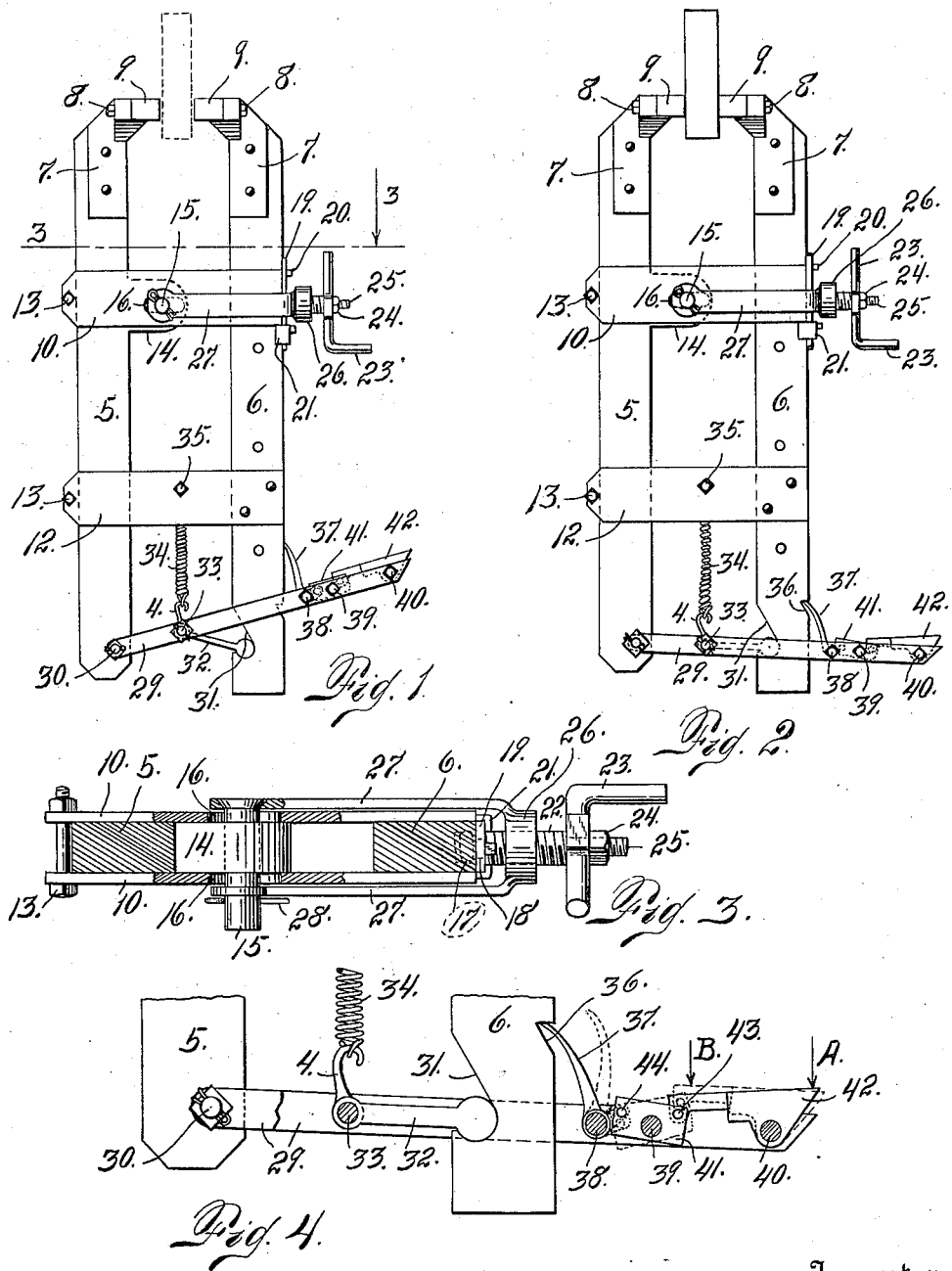

EDWARD B. NEWNAM, DECEASED, LATE OF DENVER, COLORADO, BY SARAH FRANCES NEWNAM, ADMINISTRATRIX, OF DENVER, COLORADO.

FOOT-VISE.

1,093,461. Specification of Letters Patent. Patented Apr. 14, 1914.

Application filed February 27, 1913. Serial No. 751,068.

*To all whom it may concern:*

Be it known that EDWARD B. NEWNAM, deceased, late a citizen of the United States, residing in the city and county of Denver, State of Colorado, did invent certain new and useful Improvements in Foot-Vises, and that I, SARAH FRANCES NEWNAM, administratrix, do declare the following to be a full, clear, and exact description of the invention, such as will enable others skilled in the art to which it appertains to make and use the same, reference being had to the accompanying drawing, and to the letters and figures of reference marked thereon, which form a part of this specification.

This invention relates to improvements in foot vises of the nature illustrated and described in Patents Nos. 663,819 and 738,055 granted to Edward B. Newnam, August 22, 1898, and September 1, 1903, respectively.

One object of the invention is to provide means for readily and quickly shifting the position of the pivot upon which the bars rock with relation to one of said bars.

Another object of the invention is to provide an improved foot lever apparatus for spreading the lower extremities of the bars.

Still another object is the provision of the positive dog operating mechanism capable of ready control by the foot.

Other objects will appear hereinafter as I proceed with the description of that embodiment of the invention, which, for the purposes of the present application is illustrated in the accompanying drawing, in which:

Figure 1 is a side elevation of the improved foot vise with the jaws in inoperative position. Fig. 2 is a similar view with the jaws in operative position. Fig. 3 is a cross section taken approximately upon the line 3—3, Fig. 1. Fig. 4 is a fragmental detail upon a larger scale of the lower portion of the vise with one of the bars of the foot lever broken away to disclose to view the dog mechanism.

The same reference characters refer to like parts throughout the views.

In the drawing, which forms a part of this specification, 5 and 6 are vertical bars constituting the principal elements of the vise. Brackets 7 straddle the tops of the bars 5 and 6 to which they are riveted. Within the brackets 7 are secured by means of screw bolts 8, clamping jaws 9.

Horizontal members 10 and 12 are riveted to the vertical bar 6 and form guides for the vertical bar 5, their free extremities being joined by bolts 13. Extending inwardly from the bar 5 is a short arm 14 which is almost hidden in the assembled vise by the bars 10. This arm 14 contains a perforation into which fits a pin 15. Slots 16 are cut into the bars 10 to permit movement of the pin 15 longitudinally of the bars 10.

A cylindrical socket is formed in the outer edge of the bar 6 for the reception of a smooth cylindrical member 17 from which extends outwardly a projection 18 of smaller diameter. The cylindrical member 17 is held in place in the bar 6 by a plate 19 which bears against the shoulder formed at the juncture of the member 17 and the projection 18. The plate 19 is in turn secured in position by screws or bolts 20 and clips 21. The projection 18 is secured centrally in one extremity of a screw 22, upon a squared portion of which is a handle 23 held in position by a nut 24 which is threaded upon the extremity 25 of lessened diameter.

A collar 26 internally threaded to correspond with the threads of the screw 22 is mounted upon the latter and has arms 27 extending inwardly upon either side of the members 10. The collar 26 and arms 27 are hereinafter termed a yoke. The inner ends of the arms 27 are provided with enlargements which contain perforations through which the pin 15 also passes. The head of the pin 15 prevents its dislodgment in one direction while a cotter pin 28 inserted through a hole in the pin 15 prevents movement in the opposite direction.

It will be apparent that when it is desired to bring the clamping jaws close together the lower extremities of the bars 5 and 6 must be spread apart in order to rock the bars upon the pivot pin 15. To this end a foot lever composed of two bars 29 arranged upon the opposite sides of the vertical bars 5 and 6 is mounted upon a pivot pin 30 set into the bar 5. In the bar 6 there is formed a notch 31 having a curved bottom in which rests one end of a link 32, the opposite end of which is journaled upon a pin 33 mounted between the bars 29 of the foot lever. Also journaled upon the pin 33 is a hook 4 which engages the lower extremity of a coil spring 34 supported at its upper extremity by a bolt 35 mounted in the horizontal members 12.

In the outer edge of the bar 6 there is a notch 36 adapted to receive a dog 37 which is pivoted upon a pin 38, the latter being mounted in the bars 29. Two other pins 39 and 40 are similarly mounted in the bars 29, the pin 39 supporting rotatably at approximately their middle points links 41 only one of which is seen in Fig. 4 while the pin 40 supports a foot piece 42 at a position intermediate of its ends. The links 41 are pivotally connected at 43 to the foot piece 42 and at 44 to a projection 45 upon and approximately at right angles to the dog 37.

The operation of this improved foot vise will be largely obvious from the foregoing disclosure.

With the foot lever in the position of Fig. 1 the handle 23 is turned one way or the other until the clamping jaws 9 are spaced just enough to permit the article to be clamped to be readily inserted (as indicated by the dotted lines, Fig. 1). Then the operator's foot is placed upon the foot piece 42, the heel at the position indicated by the arrow A, Fig. 4, and the toe at the position of the arrow B. He then presses downwardly, exerting slightly heavier pressure with his heel than with his toe thereby causing the dog mechanism to take the position shown in dotted lines, Fig. 4. After the foot lever has been depressed to the position where the link 32 is parallel with the foot lever the operator rocks the foot piece 42 forwardly by means of pressure with his toe, thus causing the dog 37 to engage the notch 36 and retain the lever in the position of Fig. 4. By this means the bars 5 and 6 have been spread apart at their lower ends, thereby rocking the bars upon their pivot 15 and pressing the clamping jaws together against the work as illustrated in Fig. 2.

When the work is to be removed from the vise, the dog 37 is unlocked by the reverse of the operation above described and the spring 34 acts to draw the pivot 32 upwardly, thereby causing the lower extremities of the bars 5 and 6 to move toward each other and the clamping jaws to be separated.

Although the construction of the improved vise has been herein described with considerable detail, it should be understood that such details are only illustrative, since it is obvious that minor changes in the construction may be made without departing from the spirit of the invention as set forth in the appended claims.

I claim:

1. In a vise, two clamping jaws each supported upon one of a pair of substantially parallel bars, arms extending inwardly beyond said bars one bar being movable with respect to the arms, a pivotal connection between said arms at a point fixed with relation to both of said arms, means for moving the last named bar toward or away from said pivotal connection and means for rocking said bars upon said pivotal connection.

2. In a vise, two clamping jaws, two substantially parallel bars, upon which said jaws are supported, an inwardly extending arm upon one bar and an inwardly extending yoke upon the other bar, a pivot connection between the adjacent extremities of said arm and yoke, means for longitudinally adjusting said yoke upon its bar, and means for rocking said bars upon said pivot.

3. In a vise, two clamping jaws, two substantially parallel bars upon which said jaws are mounted, arms extending inwardly beyond said bars, a pivotal connection between the said arms at a point fixed with relation to said arms, means for moving said pivotal connection with respect to one of said bars and means for rocking said bars upon said pivot.

4. In a vise, two clamping jaws, two vertical bars upon which said jaws are mounted, arms extending inwardly from said bars below the jaws, a pivotal connection between said arms, means adapted to be operated by hand for moving said pivotal connection with respect to one of said bars and means located at the lower extremities of the bars and adapted to be operated by the foot for spreading the bars.

5. In a vise, vertical bars, clamping jaws at the upper extremities of said bars, a lever pivoted to the lower extremity of one of said bars, a link pivotally connected to said lever and to the other of said bars, a dog pivoted upon said lever, a foot piece pivoted intermediate of its extremities upon said lever, a link pivoted at its extremities to the dog and a foot piece, said link being pivoted intermediate of its extremities to the lever.

In testimony whereof I affix my signature in the presence of two witnesses.

SARAH FRANCES NEWNAM,
*Administratrix.*

Witnesses:
SOLON J. BOUGHTON,
ANNA LOUISE LEHMAN.

Copies of this patent may be obtained for five cents each, by addressing the "Commissioner of Patents, Washington, D. C."